(12) United States Patent
Cermak et al.

(10) Patent No.: US 10,589,717 B2
(45) Date of Patent: Mar. 17, 2020

(54) VEHICLE REMOTE START FUNCTIONALITY

(71) Applicant: GENERAL MOTORS LLC, Detroit, MI (US)

(72) Inventors: Alexander X. Cermak, Grosse Pointe Woods, MI (US); Esteban Camacho, Belleville, MI (US); Ryan Olejniczak, Clinton Township, MI (US); Jeffrey J. Haase, Sterling Heights, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 107 days.

(21) Appl. No.: 15/840,734

(22) Filed: Dec. 13, 2017

(65) Prior Publication Data

US 2019/0176752 A1    Jun. 13, 2019

(51) Int. Cl.

| | |
|---|---|
| *B60R 25/01* | (2013.01) |
| *H04L 12/28* | (2006.01) |
| *B60R 25/20* | (2013.01) |
| *B60R 25/33* | (2013.01) |
| *B60R 16/023* | (2006.01) |
| *B60R 25/24* | (2013.01) |
| *E05F 15/00* | (2015.01) |

(52) U.S. Cl.
CPC ........ *B60R 25/209* (2013.01); *B60R 16/0237* (2013.01); *B60R 25/01* (2013.01); *B60R 25/24* (2013.01); *B60R 25/33* (2013.01); *E05F 15/00* (2013.01); *H04L 12/2814* (2013.01); *B60R 2325/105* (2013.01); *B60R 2325/207* (2013.01)

(58) Field of Classification Search
CPC ...... B60R 25/209; H04L 12/2814; G07C 5/02
USPC ............................................................ 701/2
See application file for complete search history.

(56) References Cited

U.S. PATENT DOCUMENTS

| | | | |
|---|---|---|---|
| 8,378,800 B2 * | 2/2013 | Mackjust | B60R 25/10 123/179.2 |
| 2006/0271246 A1 * | 11/2006 | Bell | B60R 25/04 701/1 |
| 2008/0117079 A1 * | 5/2008 | Hassan | B60R 25/045 340/901 |
| 2014/0277839 A1 * | 9/2014 | Flick | F02N 11/0807 701/2 |
| 2015/0159615 A1 * | 6/2015 | Van Wiemeersch | F02N 11/0807 701/113 |

* cited by examiner

*Primary Examiner* — Tan Q Nguyen
(74) *Attorney, Agent, or Firm* — Reising Ethington P.C.; David Willoughby

(57) ABSTRACT

A system and method of method of operating a vehicle using wireless communications, the method including: receiving a remote vehicle ignition start request via a wireless signal, wherein the remote vehicle ignition start request is a request to start an ignition of the vehicle; when the remote vehicle ignition start request is received, obtaining vehicle state information including a vehicle operating state and/or a vehicle environmental state; in response to receiving the remote vehicle ignition start request, selecting one or more remote start operating parameters based at least partly on the obtained vehicle state information; and after determining the one or more operating parameters, carrying out the remote command request according to the one or more selected remote start operating parameters.

9 Claims, 6 Drawing Sheets

VEHICLE REMOTE START FUNCTIONALITY

INTRODUCTION

The disclosure generally relates to vehicle communications systems, and more particularly, to systems and method for transferring data between a location-based wireless communications device and a vehicle using short-range wireless communications.

Many vehicles are now equipped with electronics configured to carry out various network communications. For example, many vehicles can transmit voice and data communications over both a short-range wireless network, such as Wi-Fi™, and a cellular network, such as GPRS or CDMA. Many of these vehicle electronics are configured to send or receive data to and/or from a remote server, such as a vehicle backend service facility, or to other wireless communications devices. Moreover, wireless communications can be used to wirelessly and/or remotely control various vehicle functions.

SUMMARY

According to one aspect of the invention, there is provided a method of operating a vehicle using wireless communications, the method including: receiving a remote vehicle ignition start request via a wireless signal, wherein the remote vehicle ignition start request is a request to start an ignition of the vehicle; when the remote vehicle ignition start request is received, obtaining vehicle state information including a vehicle operating state and/or a vehicle environmental state, wherein the vehicle state information is based at least partly on one or more sensor readings from one or more vehicle sensors that are installed on or within the vehicle, and wherein the obtaining of the vehicle state information includes recalling the sensor readings from a computer-readable memory device included in the vehicle or receiving the sensor readings from the one or more vehicle sensors via a communications bus included in the vehicle; in response to receiving the remote vehicle ignition start request, selecting one or more remote start operating parameters based at least partly on the obtained vehicle state information; and after determining the one or more operating parameters, carrying out the remote command request according to the one or more selected remote start operating parameters.

According to various embodiments, this method may further include any one of the following features or any technically-feasible combination of these features:

the selection of the remote start operating parameters includes selecting any one or more of the following: a first reduced remote start time when it is determined that the vehicle is within an enclosed space; a second reduced remote start time when it is determined that the fuel level of the vehicle is lower than a fuel level threshold; a vehicle storage facility door open function when it is determined that the vehicle is within the enclosed space; an extended remote start time when it is determined that an ambient temperature of the vehicle is below a minimum temperature threshold or when it is determined that the ambient temperature of the vehicle is above a maximum temperature threshold; a windshield defogger function when it is determined that snow is on the windshield; and/or a seat heating and/or steering wheel heating function when it is determined that the ambient temperature of the vehicle is below the minimum temperature threshold;

the selection of the remote start operating parameters includes either selecting the first reduced remote start time when it is determined that the vehicle is within the enclosed space or selecting the vehicle storage facility door open function when it is determined that the vehicle is within the enclosed space, wherein the determination of whether the vehicle is within the enclosed space is based at least partly on vehicle proximity sensor readings or vehicle storage facility door status information, wherein the vehicle proximity sensor readings are obtained from one or more proximity sensors included on the vehicle, and wherein the vehicle storage facility door status information includes an indication of whether a vehicle storage facility door is in an open or a closed position;

the selection of the remote start operating parameters includes selecting the vehicle storage facility door open function when it is determined that the vehicle is within the enclosed space and when it is determined the vehicle is located at the vehicle storage facility, wherein the vehicle storage facility is associated with the vehicle, and wherein the determination of whether the vehicle is located at the vehicle storage facility includes comparing a geographical location of the vehicle to a geographical location of the vehicle storage facility or receiving one or more short-range wireless communication signals at a wireless communications device included in the vehicle from a short-range wireless communication device that is located at or near the vehicle storage facility;

the steps of: receiving a plurality of global navigation satellite system (GNSS) signals at a GNSS receiver included in the vehicle; determining the geographical location of the vehicle by processing the GNSS signals at the GNSS receiver; sending the geographical location of the vehicle to a remote server, wherein the remote server is configured to access a database to obtain a geographical location of the vehicle storage facility and to carry out a comparison of the geographical location of the vehicle to the location of the vehicle storage facility to determine whether the vehicle is located at the vehicle storage facility; receiving a vehicle location status message that is based on the comparison of the geographical location of the vehicle to the location of the vehicle storage facility; and in response to receiving the vehicle location status message, obtaining the vehicle proximity sensor readings or the vehicle storage facility door status information;

the step of when it is determined that the vehicle is within the enclosed space and when it is determined the vehicle is located at the vehicle storage facility, then transmitting a vehicle storage facility door open signal using a garage door remote included in the vehicle thereby causing the vehicle storage facility door at the vehicle storage facility to move from the closed position to the open position;

the ambient temperature of the vehicle is determined through use of a digital thermometer located at the vehicle, wherein it is determined that snow is on the windshield through use of a precipitation sensor installed on the vehicle, and wherein the selection of the remote start operating parameters includes selecting one or more of the following: the extended remote start time when it is determined that the ambient temperature of the vehicle is below the minimum temperature threshold or when it is determined that the ambient temperature of the vehicle is above the maximum temperature threshold; the windshield defogger function when it is determined that snow is on the windshield; and/or the seat heating and/or steering wheel heating function when it is determined that the ambient temperature of the vehicle is below the minimum temperature threshold;

the selection of the remote start operating parameters includes selecting the second reduced remote start time when it is determined that the fuel level of the vehicle is lower than the fuel level threshold, and wherein the fuel level of the vehicle is determined by recalling a last measured vehicle fuel level from the computer-readable memory device or by, in response to receiving the remote vehicle ignition start request, using a fuel gauge included in the vehicle to measure the fuel level of the vehicle; and/or the vehicle state information includes a location of the vehicle.

According to another aspect of the invention, there is provided a method of operating a vehicle using wireless communications, wherein the method is carried out by one or more remote servers, the method including: receiving configuration details from an electronic computing device via a first remote network connection, wherein the configuration details are at least partly inputted by a user using a graphical user interface (GUI) that is presented as a part of a home automation controller configuration application, wherein the configuration details include a home automation identifier and user credentials, wherein the home automation identifier includes information identifying a home automation controller; authenticating the user credentials that were received as a part of the configuration details; obtaining at least one radio frequency (RF) remote start code associated with the vehicle, wherein the at least one RF remote start code, when transmitted by the home automation controller, causes an ignition of the vehicle to start when the vehicle is within transmission range of a wireless transmitter included in the home automation controller; and sending the at least one RF remote start code to the home automation controller.

According to various embodiments, this method may further include any one of the following features or any technically-feasible combination of these features:

the home automation controller configuration application is a web application that is operable through use of a web site browser or that is otherwise hosted over the first remote network connection;

the home automation controller configuration application is embodied within an executable program file that is installed on the electronic computing device;

the step of, after receiving the configuration details and authenticating the user credentials, establishing a second remote network connection with the home automation controller based at least partly on the configuration details that were received from the electronic computing device;

the at least one RF remote start code is sent to the home automation controller via the second remote network connection;

the configuration details include electronic addressing information of the home automation controller that enables the establishment of the second remote network connection;

the home automation controller is a standalone intelligent personal assistant that includes a power supply and a wireless network interface card, wherein the wireless network interface card allows for short-range wireless communications with a network access device (NAD);

the wireless transmitter of the home automation controller is a radio transmitter; and/or the home automation controller is configured to transmit one of the at least one RF remote start code using the radio transmitter upon receiving speech signals from an operator that indicate an intention to carry out a remote vehicle ignition start function at the vehicle.

According to yet another aspect of the invention, there is provided a method of operating a vehicle using wireless communications, the method including: receiving a remote vehicle ignition start request, wherein the remote vehicle ignition start request is a request to start an ignition of the vehicle, and wherein the remote vehicle ignition start request originated at a home automation controller that is included at a vehicle storage facility or a location adjacent to the vehicle storage facility; when the remote vehicle ignition start request is received, obtaining vehicle state information including a vehicle operating state and/or a vehicle environmental state, wherein the vehicle state information is based at least partly on one or more sensor readings from one or more vehicle sensors that are installed on or within the vehicle; in response to receiving the remote vehicle ignition start request, selecting one or more remote start operating parameters based at least partly on the obtained vehicle state information, wherein the selection of the remote start operating parameters includes selecting any one or more of the following: a first reduced remote start time when it is determined that the vehicle is within an enclosed space of the vehicle storage facility; a second reduced remote start time when it is determined that the fuel level of the vehicle is lower than a fuel level threshold; a vehicle storage facility door open function when it is determined that the vehicle is within the enclosed space of the vehicle storage facility; an extended remote start time when it is determined that an ambient temperature of the vehicle is below a minimum temperature threshold or when it is determined that the ambient temperature of the vehicle is above a maximum temperature threshold; a windshield defogger function when it is determined that snow is on the windshield; and/or a seat heating and/or steering wheel heating function when it is determined that the ambient temperature of the vehicle is below the minimum temperature threshold; and after determining the one or more operating parameters, carrying out the remote command request according to the one or more selected remote start operating parameters.

According to various embodiments, this method may further include the remote vehicle ignition start request is sent from the home automation controller, wherein the remote vehicle ignition start request is embodied in one or more radio frequency (RF) remote start codes, and wherein the home automation controller is issued the one or more RF remote start codes from a remote server.

BRIEF DESCRIPTION OF THE DRAWINGS

Exemplary embodiments will hereinafter be described in conjunction with the appended drawings, wherein like designations denote like elements, and wherein.

DETAILED DESCRIPTION

Figure 1:
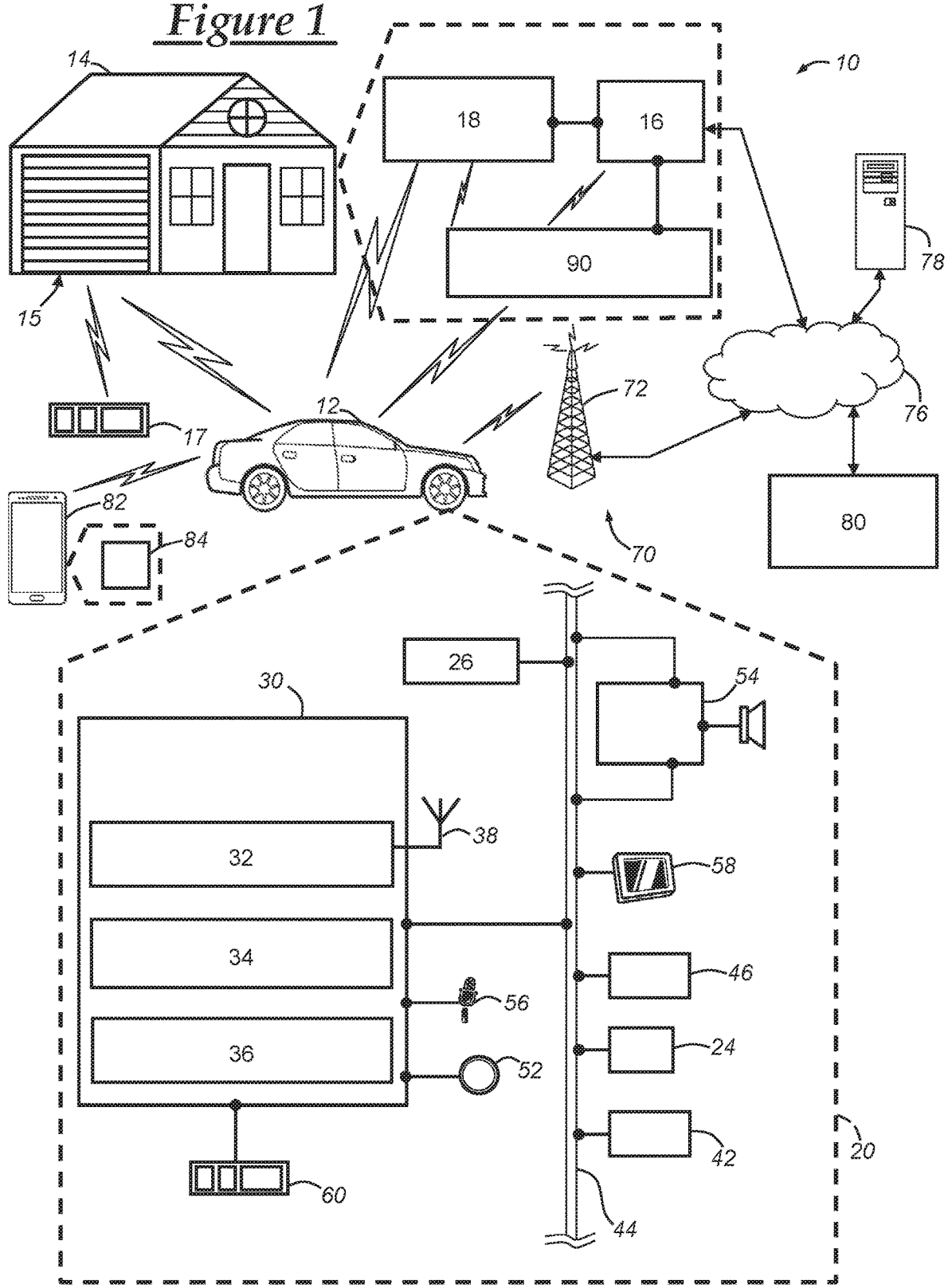
FIG. 1 is a block diagram depicting an embodiment of a communications system that is capable of utilizing the method disclosed herein.

The system and method described below enable the wireless control and/or operation of a vehicle. According to one embodiment, the system and method enable a remote start request to be received at a vehicle, vehicle state information to be obtained by the vehicle, one or more remote start operating parameters to be determined based on the vehicle state information and/or the remote start request, and the remote start command to be carried out according to the determined remote start operating parameters. In other embodiments, the system and method enable a home automation controller to be configured to control one or more vehicle functions, including a remote vehicle ignition start function, through the transmission of wireless signals from the home automation controller to the vehicle.

In one particular embodiment, a vehicle operator may use a remote vehicle control application to generate and send a remote vehicle ignition start request to a vehicle. The vehicle may then receive the remote vehicle ignition start request and, in response thereto, can obtain vehicle state information, including vehicle operating state information and/or vehicle environmental state information. As used herein, vehicle operating state information is any information regarding the operation of the vehicle, such as a battery level of the vehicle, a state of the vehicle ignition, and a gas level of the vehicle. And, as used herein, vehicle environmental state information is any information regarding the surrounding environment of the vehicle, such as the present weather (including precipitation levels or probabilities) and interior or exterior temperatures. Once the vehicle state information is obtained, the vehicle can then determine one or more remote start operating parameters based on this information. For example, when the temperature is below a minimum temperature threshold, then the vehicle can increase the remote start time, which is the time that the vehicle will be started for, or attempted to be started for, before the operator arrives at the vehicle. In another embodiment, when the vehicle state information reflects that the vehicle is located within an enclosed area, then the remote start time can be decreased so as to not build up a dangerous concentration of carbon monoxide or other toxic gases within the enclosed space.

In another embodiment, a home automation controller can be configured to control remote vehicle functionality, such as remote vehicle ignition start functionality. The home automation controller can be configured by a user through use of a web interface application that enables the user to input credentials associated with remote vehicle control and that, thereafter, sends the inputted credentials to a vehicle backend server that is configured to confirm/deny authentication based on the credentials. Once the vehicle backend server authenticates the user using the credentials, then the backend server can identify specific radio frequency (RF) codes and, subsequently, can send these RF codes to the home automation controller. Thus, the home automation can transmit the RF codes to carry out one or more vehicle functions.

Referring now to FIG. 1, there is shown an operating environment having a communications system 10 and that can be used to implement the method disclosed herein. Communications system 10 generally includes a vehicle 12 with a wireless communications device 30, a residence 14 with a home automation controller 90 and a garage door system 15, one or more wireless carrier systems 70, a land communications network 76, a computer 78, a remote facility 80, and a personal mobile device 82. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which include telematics equipment in vehicle 12). Carrier system 70 can implement any suitable communications technology, including for example GSM/GPRS technology, CDMA or CDMA2000 technology, LTE technology, etc.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as a web server accessible by vehicle 12. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to the vehicle 12.

Remote facility 80 may be designed to provide the vehicle electronics 20, mobile device 82, and/or home automation controller 90 with a number of different system backend functions. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle identifiers, profile records, behavioral patterns, and other pertinent subscriber information. Data transmissions may be conducted by wireless systems, such as IEEE 802.11x, GPRS, and the like.

In one embodiment, the remote facility 80 can include vehicle remote command codes, such as radio frequency (RF) codes, that can be sent to one or more authenticated devices to allow such authenticated devices to use the codes to remotely or wirelessly control one or more vehicle functions. For example, a vehicle backend services application at remote facility 80 (or computer 78) can be configured to receive a vehicle wireless control code request, which is a request to receive one or more codes that enable wireless control of the vehicle. In response to receiving this vehicle wireless control code request, the backend services application can then obtain, from a vehicle command code database, the codes associated with a particular vehicle, as specified in the vehicle wireless control code request or otherwise indicated to the vehicle backend services application. These codes can be sent to the authenticated device via land network 76 and/or cellular carrier system 70.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and include a wireless communications device 30 that is connected to a garage door remote 60, a global navigation satellite system (GNSS) receiver 46, an engine control unit (ECU) 24, a body control unit (BCM) 26, other VSMs 42, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few.

The vehicle 12 can include numerous vehicle system modules (VSMs) as part of vehicle electronics 20, such as ECU 24, BCM 26, wireless communications device 30, GNSS receiver 46, garage door remote 60, and vehicle user interfaces 52-58, as will be described in detail below. The vehicle 12 can also include other VSMs 42 in the form of electronic hardware components that are located throughout the vehicle and, which may receive input from one or more sensors and use the sensed input to perform diagnostic, monitoring, control, reporting, and/or other functions. For example, other VSMs may include a telematics unit, a center stack module (CSM), an infotainment unit, a powertrain control module, or a transmission control unit. Each of the VSMs 42 is preferably connected by communications bus 44 to the other VSMs, as well as to the wireless communications device 30, and can be programmed to run vehicle system and subsystem diagnostic tests. One or more VSMs 42 may periodically or occasionally have their software or firmware updated and, in some embodiments, such vehicle updates may be over-the-air (OTA) updates that are received from a computer 78 or remote facility 80 via land network 76, home automation controller 90, and/or communications device 30. As is appreciated by those skilled in the art, the above-mentioned VSMs are only examples of some of the modules that may be used in vehicle 12, as numerous others are also possible.

Engine control unit (ECU) 24 may control various aspects of engine operation such as fuel ignition and ignition timing. ECU 24 is connected to communications bus 44 and may receive operation instructions from BCM 26 or other VSMs 42, such as wireless communications device 30. In one scenario, the ECU 24 may receive a vehicle ignition start command from the BCM to start the vehicle—i.e., initiate the vehicle ignition or other primary propulsion system (e.g., a battery powered motor). In such a scenario, the BCM 26 may first receive the vehicle ignition start command from another device, such as home automation controller 90 or personal mobile device 82. In another scenario, the ECU 24 may be provided a signal directly from the wireless communications device 30.

Body control module (BCM) 26 is shown in the exemplary embodiment of FIG. 1 as being electrically coupled to communication bus 44. In some embodiments, the BCM 26 may be integrated with or part of a center stack module (CSM) and/or integrated with wireless communications device 30. Or, the BCM may be a separate device that is connected to one another via bus 44. BCM 26 can include a processor and/or memory, which can be similar to processor 34 and memory 36 of wireless communications device 30, as discussed below. BCM 26 may communicate with wireless device 30 and/or one or more vehicle system modules, such as ECU 24, audio system 54, or other VSMs 42. BCM 26 may include a processor and memory such that the BCM may direct one or more vehicle operations including, for example, controlling central locking, air conditioning, power mirrors, controlling the vehicle primary mover (e.g., engine, primary propulsion system), and/or controlling various other vehicle modules. BCM 26 may receive data from the wireless communications device 30 and, subsequently, send the data to one or more vehicle modules.

Additionally, BCM 26 may provide vehicle state information corresponding to the vehicle state or of certain vehicle components or systems. For example, the BCM may provide the device 30 with information indicating whether the vehicle's ignition is turned on, the gear the vehicle is presently in (i.e. gear state), and/or other information regarding the vehicle. The BCM 26 can obtain information from one or more other vehicle modules to obtain this information.

Wireless communications device 30 is capable of communicating data via short-range wireless communications (SRWC). As shown in the exemplary embodiment of FIG. 1, wireless communications device 30 includes a wireless access point 32, a processor 34, memory 36, and one or more antennas 38 (only one is shown). In one embodiment, wireless communications device 30 may be a standalone module or, in other embodiments, device 30 may be incorporated or included as a part of one or more other vehicle system modules, such as a center stack module (CSM), body control module, an infotainment module, a telematics module, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short-range wireless communications (SRWC), such as WiGig™, Wi-Fi™, WiMAX™, ZigBee™, Wi-Fi Direct™, Bluetooth™ Bluetooth Low Energy™ (BLE), near field communication (NFC), or any other IEEE 802.11 protocols. As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication circuit 32 enables the wireless communications device 30 to transmit and receive SRWC signals, such as BLE signals. The SRWC circuit may allow the device 30 to connect to another SRWC device. Additionally, in some embodiments, the wireless communications device may contain a cellular chipset 34 thereby allowing the device to communicate via one or more cellular protocols, such as those used by cellular carrier system 70.

Processor 34 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 34 executes various types of digitally-stored instructions, such as software or firmware programs stored in memory 36, which enable the device 30 to provide a wide variety of services. For instance, processor 34 can execute programs or process data to carry out at least a part of the method discussed herein or to supplement at least of the method discussed herein. Memory 36 may include RAM, other temporary powered memory, any non-transitory computer-readable medium (e.g., EEPROM), or any other electronic computer medium that stores some or all of the software needed to carry out the various device functions discussed herein.

In one embodiment, the wireless communications device 30 may operate both when the vehicle is in a powered on state and when the vehicle is in a powered off state. As used herein, a "powered on state" is a state of the vehicle in which the ignition or primary propulsion system (or primary mover) of the vehicle is powered on and, as used herein, a "powered off state" is a state of the vehicle in which the ignition or primary propulsion system (or primary mover) of the vehicle is not powered on. The operation or state of the wireless communications device 30 may be controlled by another vehicle system module, such as by a BCM or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations, such as listening or probing for wireless devices to connect to.

For example, the wireless communications device 30 may be periodically woken up by a BCM and, subsequently, the device 30 may perform a scan using SRWC, such as Bluetooth Low Energy™. This scan may be carried out over a predetermined period of time or may be based on various other vehicle or environmental states. The vehicle may repeat this process until a wireless message is detected or until the vehicle is turned on (i.e., switched from a powered off state to a power on state). Upon detection of a SRWC device or receipt of a wireless message, the wireless communications device 30 may communicate with the SRWC device by transmitting and receiving one or more wireless messages. These messages may include authenticating or otherwise verifying the identity of the SRWC device which sent (or ostensibly sent) the wireless message, authorizing the SRWC device using one or more authorization techniques (as discussed more below), and/or pairing the SRWC device and the wireless communications device 30 (e.g., such as through Bluetooth™ or Bluetooth Low Energy™ pairing).

Once a connection is established between the wireless communications device 30 and the SRWC device, which may be mobile device 82 or home automation device 90, the wireless communications device 30 may wait for a wireless message from the SRWC device that includes a specific command or function. Or, the vehicle may send a command or a request to the SRWC device. Once device 30 receives such wireless message, the vehicle can authenticate and/or authorize the message and/or the SRWC device. Thereafter, the command or function may be interpreted, modified, and/or passed along to a specific VSM that is to perform the command or function. Alternatively, a new message based on the command or function may be generated and sent to another VSM. And, in other embodiments, the mobile device 82 or the home automation controller 90 can send radio frequency (RF) codes that indicate to the vehicle that a particular function is to be performed, such as starting the vehicle ignition or primary mover. At least in some embodiments, these RF codes can carry entitlement information that can be verified at the vehicle and that acts to authenticate and/or authorize the command that is also be carried by the transmitted RF codes.

A vehicle function is any function or operation that may be performed by the vehicle, including initiating or booting a telematics unit, a GNSS receiver, an infotainment unit, a center stack module (CSM), or other VSM. Additionally, a vehicle function may be unlocking or locking the vehicle doors via a BCM, starting the ignition or primary propulsion system of the vehicle, disabling/enabling the vehicle ignition or primary propulsion system, heating or cooling passenger seats included in the vehicle, performing air conditioning or heating of the vehicle cabin, turning off/on or flashing headlights or other lights included in the vehicle, emitting an audible sound using a vehicle horn or speakers (such as those included in audio system 54), downloading information (e.g., over-the-air updates) or content data (e.g., audio/video playlists or files) from a remote device or a device at location 14, downloading or uploading information and/or content data from or to a SRWC device (e.g., home automation controller 90), and/or performing various other operations or functions of the vehicle, many of which are described herein. Additionally, some vehicle functions may be modified, enabled, or disabled based on certain conditions, including the present vehicle state, detection of the vehicle's presence at a location (e.g., residence 14), the weather or other environmental conditions, the identity of the SRWC device, and/or the time of day. For example, when the external air temperature is above a maximum temperature threshold, then the air conditioner may be initiated. Such vehicle functions may also be carried out upon the loss of connection of the SRWC device, the powering off of the vehicle, and/or upon a determination that a vehicle operator or passenger has departed the vehicle.

Wireless communications device 30 may be in communication with one or more remote networks via packet-switched data communication. This packet-switched data communication may be carried out through use of a wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30 via, for example, a telematics unit included in the vehicle. In one embodiment, the communications device 30 may also include a cellular chipset or be communicatively coupled to a device comprising a cellular chipset such as a telematics unit. In either event, communications device 30 may, via a cellular chipset, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art. In modern networks such as LTE, voice and data communications may be carried out in parallel.

Global navigation satellite system (GNSS) receiver 46 receives radio signals from a constellation of GNSS satellites. In one embodiment, the GNSS receiver 46 may be a global positioning system (GPS) receiver, which may receive GPS signals from a constellation of GPS satellites (not shown). From these signals, the module 46 can determine vehicle position which may enable the vehicle to determine whether it is at a known location, such as home or workplace. Moreover, GNSS receiver 46 can provide this location data to wireless communications device 30, which can then use this data to identify known locations, such as a vehicle operator's home or workplace. Additionally, GNSS receiver 46 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GNSS receiver 46), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management and/or for use in a car sharing service. Also, new or updated map data can be downloaded to the GNSS receiver 46 from the remote facility 80 via a vehicle telematics unit.

Vehicle garage door remote 60 is depicted as an OEM-installed electronic module that is part of the vehicle electronics 20. By "OEM-installed" it is meant that the remote 60 is installed either by the manufacturer during production of the vehicle, or by a manufacturer's dealer or retailer after receipt of the vehicle from the manufacturer. Garage door remote 60 may comprise: one or more buttons or any other input devices; a radio frequency (RF) transmitter or transceiver; memory; a processor; and any other needed or desired electronic hardware components, as will be known to those skilled in the art. Garage door remote 60 may be fixed to the interior of vehicle 12 and may be wired into wireless communications device 30. Garage door remote 60 may be programmed to communicate with one or more garage door openers (such as that which is included in garage door system 15) and/or to control the actuation of a garage door through sending garage door actuation requests to the garage door system 15. For example, upon a vehicle operator pressing a button on garage door remote 60, a signal may be sent via the RF transceiver to a nearby garage door opener instructing it to activate (open or close) the garage door and, contemporaneously, a signal may be sent to wireless communications device 30 indicating that it has transmitted a garage door close signal to the garage door opener. Communication between the vehicle and garage door remote 60 is not limited to communication via a wired connection between remote 60 and wireless communications device 30. Wired or wireless communication may be conducted between remote 60 and any hardware component connected to vehicle 12, namely those within the vehicle electronics 20. In one alternative embodiment, the vehicle electronics 20 may include an antenna that detects the RF door activation signal sent by remote 60 and use that as an indication that the garage door remote button has been pressed.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 44 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

The mobile device 82 is a SRWC device and may include: hardware, software, and/or firmware enabling cellular telecommunications and SRWC as well as other mobile device applications. The hardware of the mobile device 82 may comprise: a processor and memory (e.g., non-transitory computer readable medium configured to operate with the processor) for storing the software, firmware, etc. The mobile device processor and memory may enable various software applications, which may be preinstalled or installed by the user (or manufacturer) (e.g., having a software application or graphical user interface or GUI). One implementation of a vehicle-mobile device application 84 may enable a vehicle user to communicate with the vehicle 12 and/or control various aspects or functions of the vehicle, some of which are listed above. Also, the application 84 could be a home automation controller configuration application that enables a user to configure the home automation controller 90 for use with the vehicle, such as for enabling the home automation controller 90 to transmit RF codes that control one or more vehicle functions.

Figure 2:
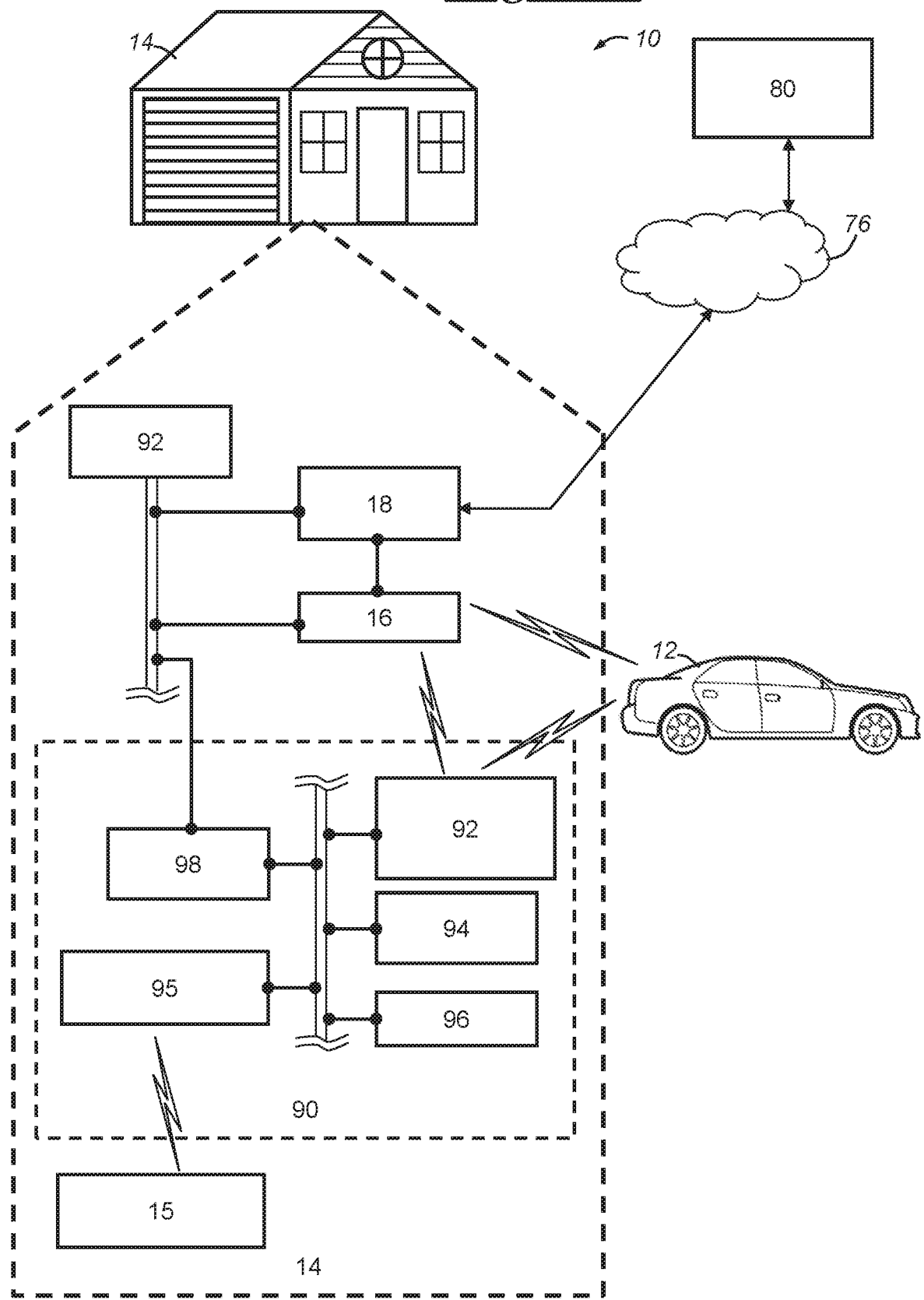
FIG. 2 is a block diagram depicting a more detailed view of some of the elements included in the embodiment of the communications system of FIG. 1.

With reference to FIG. 2, there is shown a more detailed view of some of the components included in the embodiment of the communications system of FIG. 1, namely the location or residence 14, including the garage door system 15 and the home automation controller 90.

The location 14 is depicted as a residential home, however, it should be appreciated that location 14 may be any other type of location. Location 14 is shown to include a network access device (NAD) 16, a network computing device 18, power source 17, and home automation controller 90. In one example, location 14 can be a residential home or other residential building (as depicted in the illustrated embodiment), a workplace, a public building or installment, place of business, a vehicle garage, parking structure, or parking lot.

Network access device (NAD) 16 is a network computing device and includes hardware that communicates with one or more remote networks. As used herein, and as those skilled in the art will appreciate, a "modem" refers to a network hardware device that modulates one or more signals to encode data for transmission and that demodulates signals to decode received data. Also, as used herein, and as those skilled in the art will appreciate, a "router" refers to a networking device that facilitates communications between computer networks, such as between an intranet (e.g., local area network (LAN), wireless local area network (WLAN), wide area networks (WAN)) and a remote network, such as the Internet or a network at remote facility 80 or computer 78. The router, which may be included as part of the network access device, may keep addressing information for devices that are a part of a local intranet, such as network computing device 18 and home automation controller 90. The addressing information may be kept in a routing table or a routing information base (RIB), which is a data structure that stores information that can be used to route IP packets that are being communicated between networks. The routing table can be stored in a memory device at network access device 16, and such functionality of the network access device can be carried out by a processor or other processing device installed in network access device 16. In one embodiment, network access device 16 includes a modem and a router, and is configured to transfer data between network computing devices and a land network 76.

Additionally, network access device 16 may include one or more network interface controllers (NIC), which can include any of a variety of network drivers, network adapters, network cards, or network interfaces. The network interface controller can be a hardware component that connects a circuit board (e.g., motherboard) or communications bus to a computer network, such as a LAN or a WLAN. In one example, a first NIC of network access device 16 can be an Ethernet card that enables communications between the network access device 16 and a network computing device via an Ethernet cable. Additionally, or alternatively, a second NIC of network access device 16 can be a wireless network interface controller (WNIC), which can include an antenna and which may operate according to one or more the SRWC communications as described above, including IEEE 802.11b/g/n/ac/ad. In many embodiments, the network access device 16 includes numerous network interfaces, including numerous wired ports, including Ethernet ports, universal serial bus (USB) ports, fiber-optic ports, token ring, as well as numerous other ports known to those skilled in the art. Additionally, or alternatively, network access device 16 may be able to communicate accord to a variety of SRWC and may include variety of WNICs.

Network computing device 18 can be any electronic device that can be connected to a computer network, and which may carry out network communications according to one or more network protocols, such as TCP/IP or UDP/IP. The network computing device may include a processor or other processing device, a memory device, and a network interface controller. In one embodiment, network computing device 18 can be a personal computer, such as a desktop computer or a laptop computer. And, in some embodiments, network computing device 18 can be used to configure home automation device 90 through allowing a user to enter information into a graphical user interface (GUI) that is displayed as part of a web application. For example, at least in one embodiment, remote computer 78 or remote facility 80 may host a web application that allows a user to enter credentials, an identifier of the home automation device 90, and other information, such as the home automation controller configuration application discussed herein. In response to receiving such information from the NAD 18, the vehicle backend services application (which may be carried out on computer 78 or at remote facility 80) can then authenticate the user and, subsequently, send RF codes to the home automation device.

Home automation controller 90 is network computing device that provides a particular set of functionality to a communications network at location 14. The home automation controller 90 is shown in the illustrated embodiment to include a wireless access point 92, a processor 94, a memory 96, and a power supply 98. The power supply may connect to power source 19, which may provide power to home automation controller 90. Power supply 98 can include a rectifier for converting alternating current to direct current, and/or may include other components, many of which are known to those skilled in the art. The power supply 98 may also include a wire and/or a male two- or three-prong plug that plugs into a standard 120 Volt or 240 Volt outlet. Other variations of deriving power from a power main at a location will be known to those skilled in the art.

In one embodiment, the home automation controller 90 can be an intelligent personal assistant (IPA) that includes voice recognition and response technology, such as a stand-alone IPA, including the Amazon™ Alexa™ or the Google™ Home, or an integrated IPA, including Siri™, Cortana™, or Google™ Now. And, in one embodiment, the home automation controller 90 can be configured to listen for subsequent speech signals upon the realization of a spoken wake word. In some embodiments, the home automation controller 90 can be connected to various other network computing devices 18, such as a personal computer (PC), one or more personal mobile devices 82, a garage door system 15, NAD 16, and/or various remote networks and servers. NAD 16 may be used to establish a local area network (LAN) or a wireless LAN (WLAN) with these local devices, or may establish a connection with various remote networks and/or servers via TCP/IP and/or other suitable remote network communication protocols.

As discussed above, home automation controller 90 includes a wireless access point 92. The wireless access point may include any one or more of the features or components described above with respect to SRWC circuit 32 included in wireless communications device 30 of vehicle 12. For example, the wireless access point 92 may operate according to any one or more of the IEEE 802.11 protocols, Wi-Fi™, WiMAX™, ZigBee™, Wi-Fi Direct™, Bluetooth™, Bluetooth Low Energy™ (BLE), or near field communication (NFC). And, in many embodiments, the WAP 92 can be configured to operate in either a client mode (or station mode) or a wireless access point mode. Additionally, the home automation controller 90 can include any number and/or variety of network interface controllers, some of which may be integrated into or with the wireless access point 92. In one embodiment, the home automation controller 90 can communicate with vehicle 12 using a wireless network card or chipset and can communicate with network access device 16 via an Ethernet cable that connects the devices respective network interfacing controllers.

In addition to acting as a wireless access point (WAP) for devices to connect to, home automation controller 90 may carry out wireless communications with another wireless access point, such as wireless communications device 30 included in vehicle 12 or network access device 16. In one embodiment, network access device 16 may provide home automation controller 90 with a connection to the Internet or other remote network, such as via land network 76. Home automation controller 90 may be set to a station or a client mode and, thus, may then carry out wireless communications with other WAPs. As used herein, a station or a client mode is an operating mode of a wireless communications device that enables the device to act as a station or client device thereby allowing the device to scan for and connect to host devices (e.g., wireless access points). More particularly, in the client mode, the client device permits another device (e.g., a server device) to control communication protocols, etc. The other WAPs may be set to a wireless access point mode and provide a hotspot for home automation controller 90 to connect to when controller 90 is operating in a station mode. A hotspot is an area where a wireless data connection may be established between a wireless device operating in a station or client mode and the device hosting the hotspot via a wireless access point. It should be appreciated that the protocol used in providing a hotspot is not limited to Wi-Fi™, and that any SRWC, such as those listed above, may be used.

Processor 94 can be any type of device capable of processing electronic instructions including any of those discussed above with respect to processor 34 of vehicle wireless communications device 30. Memory 96 can be any type of digital information storing or recording device, such as RAM, ROM, or any of the other types of memory discussed herein, including volatile or non-volatile memory.

Radio transceiver 95 can be included as part of the home automation controller 90 and, in some embodiments, including the illustrated embodiment, radio transceiver 95 can be a separate from WAP 92. However, in other embodiments, radio transceiver 95 and WAP 92 can be integrated with one another so as to share certain components, such as wireless network interfacing components and/or antennas. Radio transceiver 95 includes circuitry and an antenna that is capable of transmitting information using radio frequency (RF) technology, such as through transmitting vehicle control RF codes that can be used to cause the vehicle to perform one or more vehicle functions, such as a vehicle ignition start function. Such circuitry can be similar to that which is found in a garage door remote, such as garage door remote 60 discussed above. And, additionally or alternatively, radio transceiver can be used to send RF codes to control a garage door system 15, such as for controlling the actuation of a garage door located at the residence 14.

Garage door system 15 includes a garage door actuator that can be triggered through reception of one or more RF signals that may be sent by radio transceiver 95 of home automation controller 90, vehicle garage door remote 60, or other garage door remote 17. The garage door can be used to enclose or open at least one vehicular access portion of a garage in which a vehicle, such as vehicle 12, may be stored during non-use. As used herein, a vehicular access portion is a portion that can be enclosed or opened, such as by a vehicle storage facility door, thereby allowing a vehicle to enter or exit the garage (or other vehicle storage facility).

Figure 3:
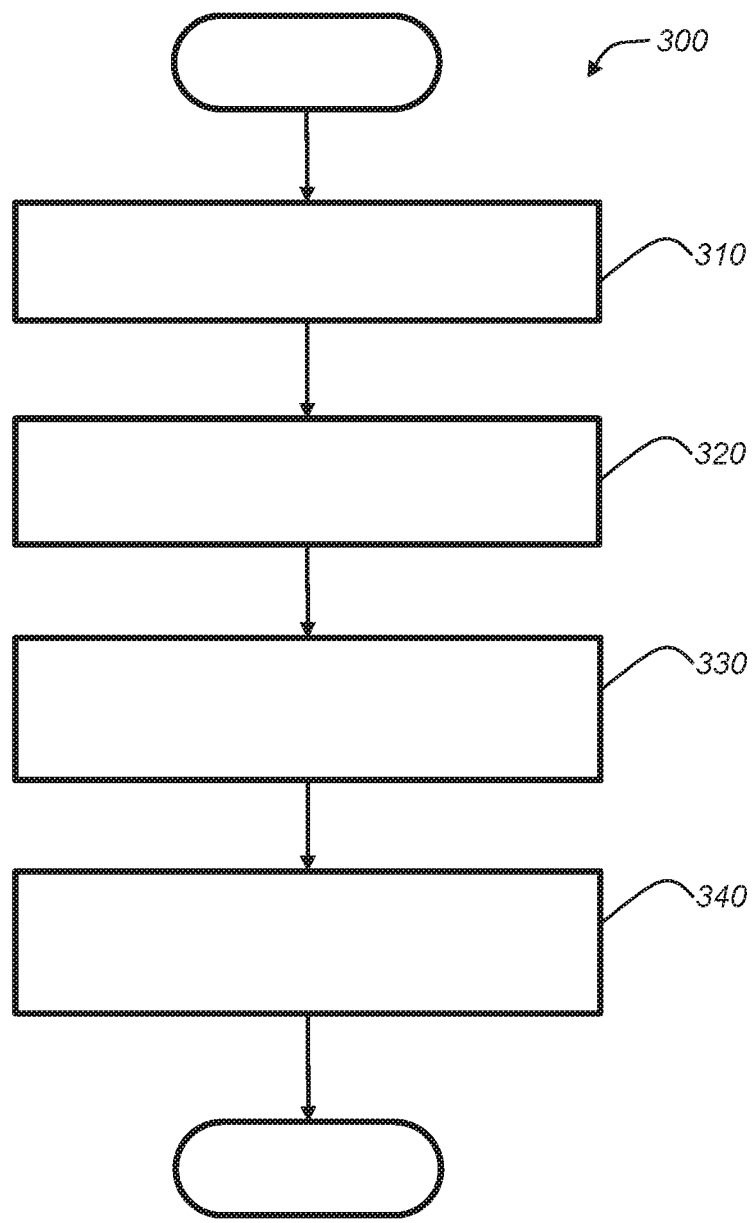
FIG. 3 is a flowchart illustrating an embodiment of a method of operating a vehicle using wireless communications.

With reference to FIG. 3, there is shown an embodiment of a method 300 of operating a vehicle using wireless communications. In at least one embodiment, the method 300 can be carried out by the vehicle 12. And, in a particular embodiment, the method 300 can be carried out by wireless communications device 30 and BCM 26 of vehicle 12.

Method 300 beings with step 310, wherein a remote command request that includes a command/request to perform a vehicle function is received. The remote command request can be a wireless message that is received from a mobile device 82 or from home automation controller 90. In one embodiment, a user may operate a graphical user interface (GUI) that is displayed on a screen of mobile device 82 as a part of a vehicle-mobile device application 84. The user, through use of the GUI and application 84, may cause the mobile device 82 to send a remote command request, such as a vehicle ignition start request—i.e., a request to start the vehicle ignition (or primary mover in the case of an electric vehicle). This request can be sent from the mobile device 82 to the vehicle 12 via cellular carrier system 70 and land network 76. Or, the request may be sent directly from mobile device 82 to vehicle 12 using SRWC, such as Bluetooth™ or Wi-Fi™.

In other embodiments, the home automation controller 90 can be used to send a remote command request to the vehicle. In one embodiment, the home automation controller 90 may first be configured by a user, such as through use of method 600 discussed below. Thereafter, the home automation controller 90 can send vehicle command radio frequency (RF) codes using radio transceiver 95 to the vehicle 12, wherein the vehicle command RF codes cause the vehicle to carry out a vehicle function, such as starting the ignition of the vehicle or other vehicle functions, as discussed above. In other embodiments, the home automation controller 90 can use WAP 92 to send the remote command request to the vehicle 12, which may include sending the remote command request via NAD 16, land network 76, and/or cellular carrier system 70. For example, when the vehicle is out-of-range of the WAP 92, the home automation controller 90 may send the request via NAD 16, land network 76, and/or cellular carrier system 70. After the remote command request is received, the method 300 continues to step 320.

In step 320, vehicle state information is obtained at the vehicle. As mentioned above, vehicle state information can include vehicle operating state information and/or vehicle environmental state information. Vehicle operating state information can be used to indicate a state of one or more vehicle system modules (VSMs) of the vehicle, such as the ECU 24 or BCM 26. As used herein, a "state" of the vehicle or VSM includes any physical, electronic, or mechanical state of the vehicle or the VSMs that can be identified by and/or obtained at the vehicle. Vehicle environmental state information can be that information that is associated with the environment immediately surrounding the vehicle. This information can describe the physical or geographical location of the vehicle (e.g., as determined by GNSS receiver 46), an ambient temperature or the temperature within or surrounding the vehicle (e.g., as determined by one or more temperature sensors included in or on the vehicle), the weather surrounding the vehicle, whether the vehicle is within an enclosed structure, the gas or fuel level of the vehicle, one or more battery levels of the vehicle, and/or the like. In one embodiment, vehicle weather information can be obtained through accessing a remote network, such as an Internet-facing application programming interface (API) that can be used to obtain weather information regarding a particular location.

In one embodiment, in response to (or after) the remote vehicle ignition start request is received, the vehicle can receive the sensor readings from the one or more vehicle sensors. Or, additionally or alternatively, the vehicle can recall, from a computer-readable, non-transitory memory device (e.g., memory 36), one or more sensor readings (or information based on one or more sensor readings, such as a flag indicating a particular state of the vehicle) from one or more vehicle sensors installed on a computer.

In one scenario, upon receiving a remote vehicle ignition start request, the vehicle may determine whether the vehicle is located in an enclosed space, such as within a closed garage (or other vehicle storage facility). The vehicle can use various vehicle system modules to make this determination, such as through using GNSS receiver 46 to determine whether the vehicle is located at a location that includes a garage and through using various sensors installed or mounted on the vehicle. Method 500 (FIG. 5) below presents an embodiment of operating a vehicle that includes determining whether the vehicle is located within an enclosed space. In various embodiments, the vehicle can include and use the following sensors or modules to obtain vehicle state information: GNSS receiver 46, BCM 26, ECU 24, wireless communications device 30, vehicle user interfaces 52-58, a temperature sensor (e.g., a digital thermometer), a precipitation sensor (e.g., a rain and/or snow sensor), a fuel gauge, a battery state of charge sensor or measurement device, vehicle cameras, vehicle proximity sensors (e.g., vehicle backup sensors, forward facing proximity sensors), wheel speed sensors, vehicle security system, vehicle light sensors, and/or passenger occupancy sensors.

At least according to some embodiments, vehicle state information may be gathered or monitored using one or more vehicle modules, including BCM 26 and/or wireless communications device 30. And, in other embodiments, the vehicle state information can be obtained in response to receiving the remote command request (step 310). Or, a combination of monitoring and/or obtaining such state information in response to receiving such command request can be used. Additionally, the vehicle can select certain vehicle state information to be obtained based on the particular vehicle function that is being requested to be performed as indicated in the remote command request. For example, method 400 (FIG. 4) described below illustrates a particular embodiment of a process for selecting one or more remote start operating parameters and, as those skilled in the art will appreciate, the particular embodiment 400 determines a remote start time through using vehicle fuel levels, whether the vehicle is in an enclosed space, and the temperature surrounding the vehicle. Thus, in such a scenario, the vehicle may determine to only obtain a set of vehicle state information that pertains to vehicle fuel levels, whether the vehicle is in an enclosed space, and the temperature surrounding the vehicle. Once the vehicle state information is obtained, the state information can be stored in memory, such as memory 36. The method 300 then proceeds to step 330.

In step 330, one or more remote command operating parameters are selected using a remote start operating parameters selection process that is carried out at least partly based on the vehicle state information. As used herein, a "remote command operating parameter" is a parameter, attribute, or condition that will be used in carrying out a vehicle function, or an ancillary vehicle function that is carried out in conjunction with a vehicle function. And, as used herein, a "remote start operating parameter" is a remote command operating parameter that is associated with a remote vehicle ignition start function. For example, the vehicle state information may indicate that the ambient temperature of the vehicle is below a minimum temperature threshold and, thus, the vehicle may increase the remote start time thereby allowing the vehicle more time to warm up before the operator arrives. In another example, the vehicle state information may indicate that the vehicle is within an enclosed area, such as a vehicle storage facility, and, thus, the vehicle may determine that a vehicle storage facility door should be opened; thus, for example, the vehicle may then carry out the ancillary function of sending a RF garage door open command to the garage door actuator or system (see step 340, and method 500 (FIG. 5)).

In one embodiment, the method may process the vehicle state information that was obtained in step 320 and, based thereon, may determine the remote command operating parameters. Following are a series of examples of the vehicle determining remote start operating parameters based on various vehicle state information: (1) when the temperature surrounding the vehicle is below a minimum temperature threshold (e.g., 20° F. or −6.66° C.), then determining to turn on seat heater(s) and/or steering wheel heater(s) (an ancillary vehicle function); (2) when the temperature surrounding the vehicle is above a vehicle seat cooling temperature threshold, then determining to turn on seat cooling devices (an ancillary vehicle function); (3) when snow is detected on the windshield (e.g., through use of a precipitation sensor installed on the vehicle), then determining to turn on a windshield defogger (an ancillary vehicle function); and when a pickup request is indicated, determining a user's location and autonomously propelling the vehicle to the user's location (an ancillary vehicle function).

Additionally, as part of the step of determining one or more remote command operating parameters, the vehicle may obtain information indicating a number of vehicle occupants and/or one or more identities of such occupants. With this information, the vehicle can determine one or more operating parameters that are tailored to the particular occupants or the particular situation. For example, when the vehicle determines that two occupants will be arriving at the vehicle, then examples (1) and (2) may be supplemented by heating or cooling only those seats within the vehicle that correspond to the occupants; for example, if two occupants are arriving, the vehicle can determine to heat the front driver's seat and the front passenger seat.

Figure 4:
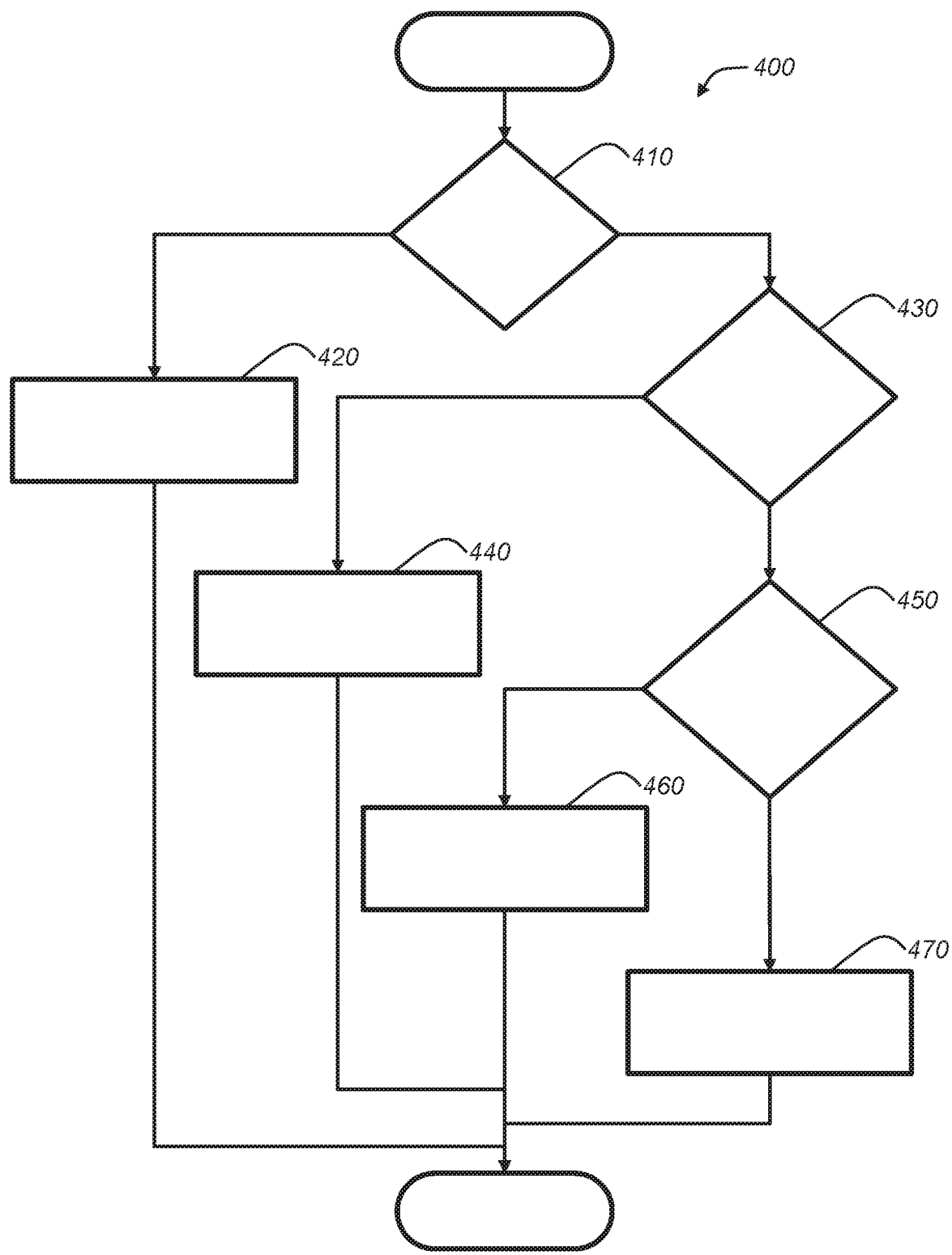
FIG. 4 is a flowchart illustrating an embodiment of a process of determining one or more remote start operating parameters.

With reference to FIG. 4, there is shown an embodiment of a remote start operating parameter determination process 400 that is used to determine a remote start time (a remote start operating parameter). Process 400 begins with step 410, wherein it is determined whether a gas level of the vehicle, as measured by a fuel gauge included in the vehicle, is lower than a gas level threshold (e.g., a half a gallon of gas). When it is determined that the gas level of the vehicle is lower than the gas level threshold, then the process continues to step 420; otherwise, the method continues to step 430.

In step 420, it is determined that the remote start time is to be set to a first reduced remote start time. As used herein, a reduced start time is a remote start time that is less than a default remote start time, which is a remote start time that the vehicle uses as a default, such as when the vehicle state information does not indicate that there is a reason for reducing or extending the remote start time. And, as used herein, an extended remote start time is a remote start time that is more than a default remote start time. In one example, the first remote start time can be 5 minutes, while the default remote start time can be 10 minutes. The process 400 then ends and, step 340 of method 300 is carried out with a remote start time corresponding to or being equal to the first reduced remote start time.

In step 430, it is determined whether the vehicle is located within an enclosed space. When it is determined that the vehicle is located within an enclosed space, such as a garage with a closed garage door, then the method continues to step 440; otherwise, the process 400 continues to step 450. In step 440, it is determined that the remote start time is to be set to a second reduced remote start time. In one embodiment, the second reduced start time is less than the default remote start time but greater than the first remote start time. In other embodiments, the second reduced start time can be less than or equal to the first reduced remote start time. The process 400 then ends and, step 340 of method 300 is carried out with a remote start time corresponding to or being equal to the second reduced remote start time.

In step 450, it is determined whether a present temperature surrounding the vehicle is greater than a maximum temperature threshold or whether the present temperature surrounding the vehicle is less than a minimum temperature threshold. In one scenario, it may be beneficial for the vehicle to operate according to an extended remote start time so that the vehicle can ramp up its heating or cooling system so as to achieve a comfortable temperature when the operators and/or passengers arrive. When it is determined that the present temperature surrounding the vehicle is greater than a maximum temperature threshold or that the present temperature surrounding the vehicle is less than a minimum temperature threshold, the process 400 continues to step 470; otherwise, the process 400 continues to step 460.

In step 460, the remote start time is set to be equal to a default remote start time. The process 400 then ends and, step 340 of method 300 is carried out with a remote start time corresponding to or being equal to the default reduced remote start time. In step 470, the remote start time is set to be equal to an extended remote start time. The process 400 then ends and, step 340 of method 300 is carried out with a remote start time corresponding to or being equal to the extended reduced remote start time.

With reference back to FIG. 3, the method 300 continues to step 340. In step 340, after determining the one or more operating parameters, the vehicle function included in the remote command request is carried out according to the one or more operating parameters. In one embodiment, the vehicle function may be a vehicle ignition start function that starts an ignition or primary mover of the vehicle. The vehicle can then carry out the vehicle function according to the determined operating parameters (step 330). For example, a vehicle ignition start function may be carried out in accordance with a reduced remote start time when the vehicle is within an enclosed space, such as a garage. In another example, the vehicle may carry out an ancillary vehicle function along with the remote ignition start function, such as turning on vehicle seat heaters. After the vehicle function is carried out according to the operating parameters, the vehicle may send a status message back to a user who initiated the remote command request or device (e.g., home automation controller 90 or mobile device 82) that generated and/or sent the remote command request. The command may be sent via cellular carrier system 70 and/or land network 76. The method 300 then ends.

Figure 5:
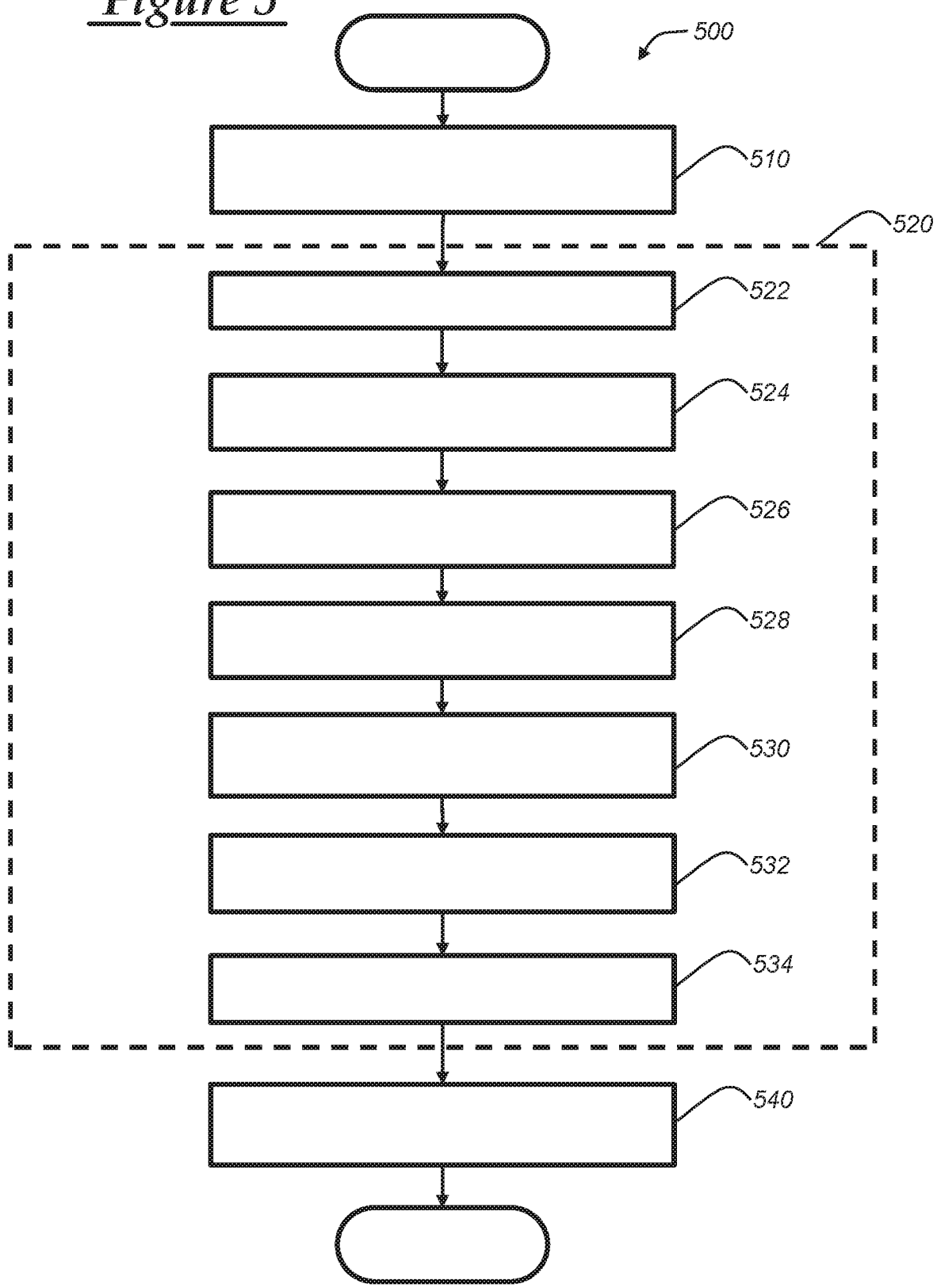
FIG. 5 is a flowchart illustrating an embodiment of a method of operating a vehicle using wireless communications.

With reference to FIG. 5, there is shown an embodiment of a method 500 for operating a vehicle using wireless communications. Method 500 is a more particular embodiment of the method 300 discussed above (FIG. 3). Method 500 can be carried out by the vehicle, including wireless communications device 30 and/or BCM 26.

Method 500 begins with step 510, wherein a vehicle ignition start request is received. The vehicle ignition start request can be a wireless message that is received from a mobile device 82 or from home automation controller 90. This step is analogous to step 310 (FIG. 3) and, thus, the discussion of step 310 is incorporated here. After a remote command request is received, method 500 continues to step 520.

In step 520, which includes steps 522-534, vehicle state information is obtained and, also, one or more remote start operating parameters are determined based on the vehicle state information and based on the remote command request. These steps are similar to steps 320 and 330 of method 300 (FIG. 3) and, thus, to the extent such discussion above is not inconsistent, that discussion is incorporated here.

In step 522, vehicle location data identifying the location of the vehicle is obtained. In one embodiment, the vehicle can use GNSS receiver 46 to receive a plurality of GNSS signals from a constellation of GNSS satellites. Then, GNSS receiver 46 can use these signals to determine a geographical location of the vehicle. In other embodiments, the vehicle can use context awareness or location awareness methods or logic to determine the location of the vehicle. For example, the vehicle may store information associating a particular service set identifier (SSID) of a network access device (NAD) (e.g., NAD 16) with a location, such as user's home or other location with a vehicle storage facility. Thus, when the vehicle recognizes an SSID as a part of a wireless message, the vehicle may conclude that the vehicle is located at the associated location, such as residence 14. And, in such an embodiment, method step 524 may be skipped since, based on this information, the vehicle may already determine that it is located at a particular vehicle storage facility. However, in other embodiments, after the vehicle's location is determined, the method 500 continues to step 524.

In step 524, the vehicle can send the location information to a vehicle backend services application, as well as at least part of the vehicle ignition start command. However, in other embodiments, the method 500 may instead proceed from step 522 to step 528 in the event that the vehicle will obtain vehicle storage facility location(s) and carry out step 530 itself. Otherwise, the method continues to step 526.

In step 526, the vehicle receives a vehicle start ignition response from a remote server, such as one or more servers that are implementing the vehicle backend services application. The vehicle start ignition response can carry authentication data or entitlement data that indicates to the vehicle, upon a successful comparison, that the vehicle's ignition should be started (or should soon be started). The method 500 continues to step 528.

In step 528, a vehicle storage facility location is determined. As used herein, a vehicle storage facility is any building or structure that can be used to store a vehicle and that has a door that can be actuated (e.g., through using an electric motor) between a closed position and an open position. In one embodiment, the vehicle storage facility can be residence 14 with garage door system 15. And, in some embodiments, this step can be carried out by a remote server, such as one or more servers that are implementing the vehicle backend services application. For example, the vehicle backend services application can query a database to obtain the vehicle storage facility location associated with the vehicle 12—in one embodiment, the information provided in step 524 can include a vehicle identifier that the vehicle backend services application can use to query a database to obtain the vehicle storage facility location associated with the vehicle 12.

And, in other embodiments, this step can be carried out by the vehicle. The vehicle can obtain location information of the vehicle storage facility through querying information stored in vehicle memory, such as memory 36, or by querying a remote server for such information, including computer 78 or a server at remote facility 80. After the vehicle storage facility location is determined, the method 500 continues to step 530.

In step 530, it is determined whether the vehicle location corresponds to the vehicle storage facility location. In some embodiments, this step can be carried out by remote facility 80 in response to the remote facility 80 receiving the vehicle location from the vehicle. In the event that the remote facility 80 carries out this step, the remote facility 80 can send a message back to vehicle 12 that indicates the vehicle is located at a vehicle storage facility associated with the vehicle. This message can be included as part of the information sent to the vehicle in step 526 or may be a separate message.

And, in other embodiments, the vehicle can carry out this step. And, in many embodiments, it can be said that the vehicle location corresponds to the vehicle storage facility location when the locations are within a predetermined distance of one another. For example, if the geographical location of the vehicle and the geographical location of the vehicle storage facility are within 250 feet, then it may be determined that the vehicle location corresponds to the vehicle storage facility location. This step can include comparing geographical coordinates of the two locations, or can be determined through the vehicle recognizing a wireless signal (e.g., a SRWC signal) that indicates that it was sent from a NAD associated with the vehicle storage facility. After it is determined whether the vehicle location corresponds to the vehicle storage facility location, the method 500 continues to step 532.

In step 532, the vehicle receives data from one or more sensors, such as from one or more vehicle sensors. After it is determined that the vehicle location corresponds to the vehicle storage facility location (step 530), then the vehicle can use a variety of techniques to determine whether the vehicle is located within an enclosed space, such as within a garage with a garage door in a closed position. In one embodiment, the vehicle can include light sensors that can be used to detect light levels, which can then be compared with the time (and/or with daylight hours at the vehicle's location (or vehicle storage facility's location)). In another embodiment, vehicle proximity sensor readings are obtained from one or more proximity sensors included on the vehicle. For example, vehicle backup sensors can be used to determine a distance between the vehicle 12 and another object behind the vehicle. In the case that the vehicle backup sensors indicate that another structure is close behind the vehicle, then it can be assumed or determined that the vehicle is in an enclosed space (step 534). The method 500 continues to step 534.

In step 534, it is determined whether the vehicle is within an enclosed space based at least partly on the received data from the one or more sensors. As mentioned above, the vehicle can use a variety of techniques to make this determination, including analyzing the data from various vehicle sensors as discussed in step 532. This analysis can be carried out by processor 34 of wireless communications device 30 or a processor of BCM 26. The method 500 continues to step 540.

In step 540, a vehicle storage facility open door signal is sent to the garage door (or other door) system of the vehicle storage facility. The vehicle storage facility open door signal is a wireless signal that indicates to the garage door system of the vehicle storage facility that a garage or other vehicle enclosing door or object should be opened. In one embodiment, a vehicle storage facility open door initiation signal can be sent by the wireless communications device 30 to vehicle garage door opener 60 of vehicle 12. This vehicle storage facility open door initiation signal indicates or otherwise causes vehicle garage door opener 60 to send the vehicle storage facility open door signal to the garage door system 15, which can include a radio transceiver and garage door actuator that can actuate the garage door between a closed and an open position. In other embodiments, the determination of whether the vehicle is in an enclosed space (step 534) can be sent to home automation controller 90, which may then send the vehicle storage facility open door signal to the garage door system 15. A vehicle storage facility open door verification message can then be sent to the device that requested the initial remote vehicle ignition start command, or indicated to a user that generated the request. The method 500 then ends.

Figure 6:
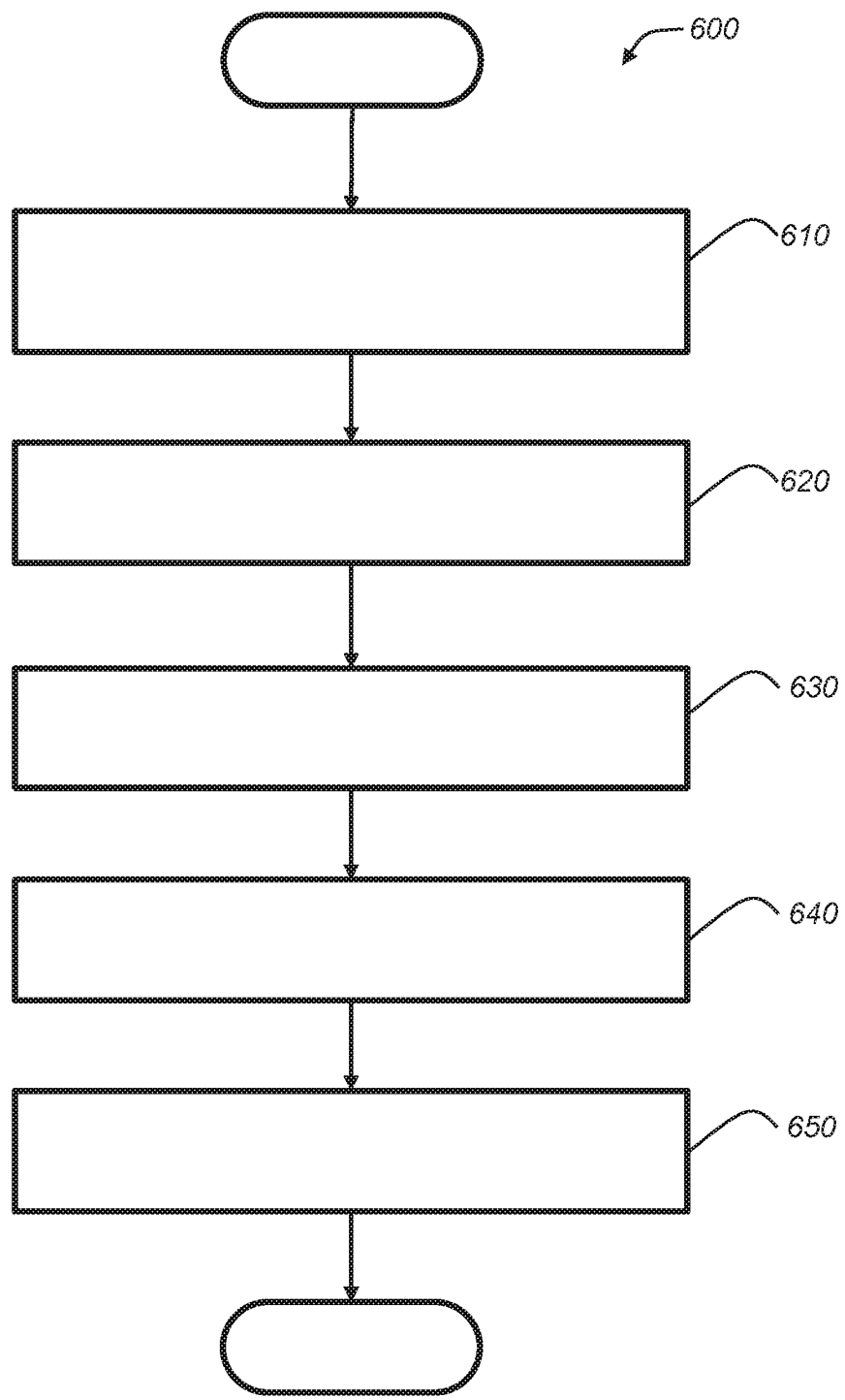
FIG. 6 is a flowchart illustrating an embodiment of a method of operating a vehicle using wireless communications.

With reference to FIG. 6, there is shown a method 600 of operating a vehicle using wireless communications. The method 600 can be carried out by a remote server, such as remote computer 78 or one or more servers located at remote facility 80. In other embodiments, method 600 (or the corollary) can be carried out by home automation controller 90.

Method 600 begins with step 610, wherein the remote server receives configuration details from an electronic computing device via a remote network connection. The electronic computing device can be any computer or other device with processing capabilities that can send information via a remote network connection. In one embodiment, the electronic computing device can be a personal mobile device 82, such as a smartphone, that uses a home automation controller configuration application that allows the user to input configuration details. The home automation controller configuration application can be a web application that is operable through use of a web site browser or that is hosted over the remote network connection. In other embodiments, the home automation controller configuration application can be embodied within an executable program file that can be downloaded and installed on the electronic computing device. In other embodiments, the electronic computing device can be network computing device 18, such as a personal computer. The remote network connection can be a connection between the electronic computing device and the remote server via land communications 76 and/or cellular carrier system 70.

The configuration details can include information pertaining to the vehicle, a user's subscription to certain vehicle-related services, and the home automation controller 90 via a graphical user interface (GUI) or other input means. In one embodiment, the user can input a username and password that can later be used to authenticate the user and/or determine one or more vehicles associated with the user's account. Also, the user can input an identifier of home automation controller 90, which can include information to identify the home automation controller. In one embodiment, a media access control (MAC) address can be included as a part of the home automation controller identifier. In other embodiments, a local internet protocol (IP) address that is assigned by NAD 16 can be used to identify the home automation controller, along with other information. And, in other embodiments, the configuration details can include other electronic addressing information of the home automation controller that enables the establishment of a remote network connection with a remote facility or server. In one embodiment, the configuration details can be sent in a single message or packet to the remote server. Or, in other embodiments, the configuration details can be sent in separate messages or packets to the remote server.

The remote server receives the configuration details and, in the case of multiple messages or packets, the remote server can combine and/or otherwise associate the separate messages or packets with one another. The remote server can then store the information, such as in a database, and, thereafter, the remote server can send a configuration details acknowledgement message back to the electronic computing device and/or the home automation controller configuration application. The method 600 continues to step 620.

In step 620, the user credentials that were received as a part of the configuration details are authenticated. In one embodiment, the user credentials include a username and a password. The authentication can include using the username to query a vehicle services subscription database (i.e., a database holding user subscription information regarding subscriptions relating to vehicle services) to obtain a password for the user identified by the username. The received password can then be verified by comparison to the password obtained from the vehicle services subscription database. Other authentication and/or authorization techniques can be used, as those skilled in the art will appreciate. The method 600 continues to step 630.

In step 630, at least one radio frequency (RF) remote start code associated with the vehicle is obtained. The remote server can access a vehicle command code database that stores codes that can be used to instruct the vehicle to perform one or more vehicle functions, such as remote start codes that instruct the vehicle to perform a vehicle ignition start function thereby causing the vehicle to start its ignition. In one embodiment, the remote start codes (or other codes) can be radio frequency (RF) codes or configuration information that can be used by home automation controller 90 (or other device). In a particular embodiment, the RF remote start codes can, when transmitted by the home automation controller, cause an ignition of the vehicle to start when the vehicle is within transmission range of a wireless transmitter included in the home automation controller. In other embodiments, other RF codes can be obtained that instruct the vehicle to perform other vehicle functions. Moreover, when an RF code, such as the RF remote start code, is transmitted and received by the vehicle, the vehicle may carry out method 300 (FIG. 3) or method 500 (FIG. 5), as discussed above. Once the RF remote start codes (and/or other codes) are obtained, the method 600 continues to step 640.

In step 640, a connection between the remote server and the home automation device is established. The connection can establish a connection using TCP/IP via land network 76 and NAD 16. The connection can carry out an authentication handshake, such as those used by Secure Sockets Layer (SSL). In one embodiment, the remote server can initiate a connection by sending a connection request message to the home automation controller 90. The connection request message can be addressed through using information included in the configuration details, such as a MAC address and/or an IP address (e.g., a local IP address issued by NAD 16 and/or an Internet-facing IP address assigned to the NAD 16).

In other embodiments, a connection between the remote server and the home automation device may not be directly established. Instead, the remote server can communicate with the home automation controller configuration application (or other application) on the electronic computing device to carry out and/or send information to the home automation controller 90, such as the RF codes (step 650). The method 600 continues to step 650.

In step 650, the at least one RF remote start code is sent to the home automation controller. According to one or more embodiments where a connection between the home automation controller and the remote server is established (step 640), the at least one RF remote start codes (or other codes) can be sent to the home automation controller 90 via the established connection. In other embodiments, the at least one RF remote start code (or other codes) can be sent to the home automation controller configuration application (or other application) on the electronic computing device. The electronic computing device can be configured such that, when the at least one RF remote start code (or other codes)

are received, the electronic computing device then sends the RF remote start codes (or other codes) to the home automation controller, such as through a local area connection (LAN) connection via, for example, NAD 16 (which may include a router) or a separate router. The method 600 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of operating a vehicle using wireless communications, the method comprising:
   receiving a remote vehicle ignition start request via a wireless signal, wherein the remote vehicle ignition start request is a request to start an ignition of the vehicle;
   when the remote vehicle ignition start request is received, obtaining vehicle state information including a vehicle operating state and/or a vehicle environmental state, wherein the vehicle state information is based at least partly on one or more sensor readings from one or more vehicle sensors that are installed on or within the vehicle, and wherein the obtaining of the vehicle state information includes recalling the sensor readings from a computer-readable memory device included in the vehicle or receiving the sensor readings from the one or more vehicle sensors via a communications bus included in the vehicle;
   in response to receiving the remote vehicle ignition start request, selecting one or more remote start operating parameters based at least partly on the obtained vehicle state information; and
   after selecting the one or more remote start operating parameters, carrying out the remote command request according to the one or more selected remote start operating parameters,
   wherein the selection of the one or more remote start operating parameters includes selecting any one or more of the following:
      a first reduced remote start time when it is determined that the vehicle is within an enclosed space;
      a second reduced remote start time when it is determined that the fuel level of the vehicle is lower than a fuel level threshold;
      a vehicle storage facility door open function when it is determined that the vehicle is within the enclosed space;
      an extended remote start time when it is determined that an ambient temperature of the vehicle is below a minimum temperature threshold or when it is determined that the ambient temperature of the vehicle is above a maximum temperature threshold;
      a windshield defogger function when it is determined that snow is on the windshield; and/or
      a seat heating and/or steering wheel heating function when it is determined that the ambient temperature of the vehicle is below the minimum temperature threshold, and
   wherein the selection of the one or more remote start operating parameters includes either selecting the first reduced remote start time when it is determined that the vehicle is within the enclosed space or selecting the vehicle storage facility door open function when it is determined that the vehicle is within the enclosed space, wherein the determination of whether the vehicle is within the enclosed space is based at least partly on vehicle proximity sensor readings or vehicle storage facility door status information, wherein the vehicle proximity sensor readings are obtained from one or more proximity sensors included on the vehicle, and wherein the vehicle storage facility door status information includes an indication of whether a vehicle storage facility door is in an open or a closed position.

2. The method of claim 1, wherein the selection of the remote start operating parameters includes selecting the vehicle storage facility door open function when it is determined that the vehicle is within the enclosed space and when it is determined the vehicle is located at the vehicle storage facility, wherein the vehicle storage facility is associated with the vehicle, and wherein the determination of whether the vehicle is located at the vehicle storage facility includes comparing a geographical location of the vehicle to a geographical location of the vehicle storage facility or receiving one or more short-range wireless communication signals at a wireless communications device included in the vehicle from a short-range wireless communication device that is located at or near the vehicle storage facility.

3. The method of claim 2, further comprising the steps of:
   receiving a plurality of global navigation satellite system (GNSS) signals at a GNSS receiver included in the vehicle;
   determining the geographical location of the vehicle by processing the GNSS signals at the GNSS receiver;
   sending the geographical location of the vehicle to a remote server, wherein the remote server is configured to access a database to obtain a geographical location of the vehicle storage facility and to carry out a comparison of the geographical location of the vehicle to the location of the vehicle storage facility to determine whether the vehicle is located at the vehicle storage facility;
   receiving a vehicle location status message that is based on the comparison of the geographical location of the vehicle to the location of the vehicle storage facility; and
   in response to receiving the vehicle location status message, obtaining the vehicle proximity sensor readings or the vehicle storage facility door status information.

4. The method of claim 3, further comprising the step of when it is determined that the vehicle is within the enclosed space and when it is determined the vehicle is located at the vehicle storage facility, then transmitting a vehicle storage facility door open signal using a garage door remote included in the vehicle thereby causing the vehicle storage facility door at the vehicle storage facility to move from the closed position to the open position.

5. The method of claim 1, wherein the vehicle state information includes a location of the vehicle.

6. A method of operating a vehicle using wireless communications, the method comprising:
receiving a remote vehicle ignition start request via a wireless signal, wherein the remote vehicle ignition start request is a request to start an ignition of the vehicle;
when the remote vehicle ignition start request is received, obtaining vehicle state information including a vehicle operating state and/or a vehicle environmental state, wherein the vehicle state information is based at least partly on one or more sensor readings from one or more vehicle sensors that are installed on or within the vehicle, and wherein the obtaining of the vehicle state information includes recalling the sensor readings from a computer-readable memory device included in the vehicle or receiving the sensor readings from the one or more vehicle sensors via a communications bus included in the vehicle;
in response to receiving the remote vehicle ignition start request, selecting one or more remote start operating parameters based at least partly on the obtained vehicle state information; and
after selecting the one or more remote start operating parameters, carrying out the remote command request according to the one or more selected remote start operating parameters,
wherein the selection of the one or more remote start operating parameters includes selecting any one or more of the following:
a first reduced remote start time when it is determined that the vehicle is within an enclosed space;
a second reduced remote start time when it is determined that the fuel level of the vehicle is lower than a fuel level threshold;
a vehicle storage facility door open function when it is determined that the vehicle is within the enclosed space;
an extended remote start time when it is determined that an ambient temperature of the vehicle is below a minimum temperature threshold or when it is determined that the ambient temperature of the vehicle is above a maximum temperature threshold;
a windshield defogger function when it is determined that snow is on the windshield; and/or
a seat heating and/or steering wheel heating function when it is determined that the ambient temperature of the vehicle is below the minimum temperature threshold, and
wherein the ambient temperature of the vehicle is determined through use of a digital thermometer located at the vehicle, wherein it is determined that snow is on the windshield through use of a precipitation sensor installed on the vehicle, and wherein the selection of the remote start operating parameters includes selecting one or more of the following:
the extended remote start time when it is determined that the ambient temperature of the vehicle is below the minimum temperature threshold or when it is determined that the ambient temperature of the vehicle is above the maximum temperature threshold;
the windshield defogger function when it is determined that snow is on the windshield; and/or
the seat heating and/or steering wheel heating function when it is determined that the ambient temperature of the vehicle is below the minimum temperature threshold.

7. The method of claim 6, wherein the selection of the remote start operating parameters includes selecting the second reduced remote start time when it is determined that the fuel level of the vehicle is lower than the fuel level threshold, and wherein the fuel level of the vehicle is determined by recalling a last measured vehicle fuel level from the computer-readable memory device or by, in response to receiving the remote vehicle ignition start request, using a fuel gauge included in the vehicle to measure the fuel level of the vehicle.

8. A method of operating a vehicle using wireless communications, the method comprising:
receiving a remote vehicle ignition start request, wherein the remote vehicle ignition start request is a request to start an ignition of the vehicle, and wherein the remote vehicle ignition start request originated at a home automation controller that is included at a vehicle storage facility or a location adjacent to the vehicle storage facility;
when the remote vehicle ignition start request is received, obtaining vehicle state information including a vehicle operating state and/or a vehicle environmental state, wherein the vehicle state information is based at least partly on one or more sensor readings from one or more vehicle sensors that are installed on or within the vehicle;
in response to receiving the remote vehicle ignition start request, selecting one or more remote start operating parameters based at least partly on the obtained vehicle state information, wherein the selection of the one or more remote start operating parameters includes selecting any one or more of the following:
a first reduced remote start time when it is determined that the vehicle is within an enclosed space of the vehicle storage facility;
a second reduced remote start time when it is determined that the fuel level of the vehicle is lower than a fuel level threshold;
a vehicle storage facility door open function when it is determined that the vehicle is within the enclosed space of the vehicle storage facility;
an extended remote start time when it is determined that an ambient temperature of the vehicle is below a minimum temperature threshold or when it is determined that the ambient temperature of the vehicle is above a maximum temperature threshold;
a windshield defogger function when it is determined that snow is on the windshield; and/or
a seat heating and/or steering wheel heating function when it is determined that the ambient temperature of the vehicle is below the minimum temperature threshold; and
after selecting the one or more operating parameters, carrying out the remote command request according to the one or more selected remote start operating parameters, and wherein the selection of the one or more remote start operating parameters includes either selecting the first reduced remote start time when it is determined that the vehicle is within the enclosed space or selecting the vehicle storage facility door open function when it is determined that the vehicle is within the enclosed space, wherein the determination of whether the vehicle is within the enclosed space is based at least partly on vehicle proximity sensor readings or vehicle storage facility door status information, wherein the vehicle proximity sensor readings are obtained from one or more proximity sensors included on the vehicle, and wherein the vehicle storage facility door status information includes an indication of whether a vehicle storage facility door is in an open or a closed position.

9. The method of claim 8, wherein the remote vehicle ignition start request is sent from the home automation controller, wherein the remote vehicle ignition start request is embodied in one or more radio frequency (RF) remote start codes, and wherein the home automation controller is issued the one or more RF remote start codes from a remote server.

* * * * *